Oct. 31, 1961 R. E. HAYNES Re. 25,074

HILLER BLADES FOR FARM CULTIVATORS

Original Filed Jan. 27, 1955

RAYMOND E. HAYNES
INVENTOR.
BY G. Lorenz Miller
ATTORNEY

United States Patent Office

Re. 25,074
Reissued Oct. 31, 1961

25,074

HILLER BLADES FOR FARM CULTIVATORS

Raymond E. Haynes, Bement, Ill.

Original No. 2,849,940, dated Sept. 2, 1958, Ser. No. 484,355, Jan. 27, 1955. Application for reissue Aug. 31, 1960, Ser. No. 53,596
4 Claims. (Cl. 172—770)

Matter enclosed in heavy brackets [ ] appears in the original patent but forms no part of this reissue specification; matter printed in italics indicates the additions made by reissue.

This invention relates to hiller blades for farm cultivators.

A primary object of the invention is to provide novel right and left blades for use on a plant row cultivator and wherein said blades are characterized by relatively short inwardly extending portions and relatively long outwardly extending portions, and wherein the latter portions function to loosen the soil while the shorter portions provide ample clearance between the pair of opposing blades as to avoid damage to the roots of the plants.

A further object of the invention is to provide each of said blades with an upwardly extending fore and aft convex wing member adjacent the shorter portion thereof for throwing a substantial volume of the soil loosened by the blades around the roots of the plants.

Other objects and advantages of the invention will become apparent in the course of the following detailed description, taken in connection with the accompanying drawing, wherein—

Figure 1:
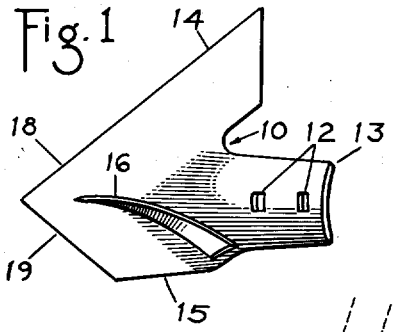
FIG. 1 is a top plan view of the right hand cultivator blade of an opposing pair thereof which are adapted to be secured to the shanks of a cultivator frame.
Figure 2:
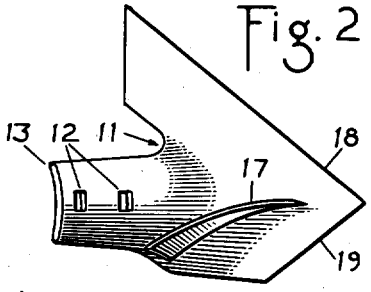
FIG. 2 is a top plan view of the left hand blade of the said pair thereof.
Figure 6:
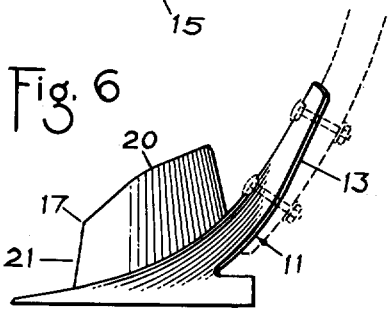
FIG. 6 is a side elevational view as observed from the outer side of the blade shown in FIG. 4.
Figure 5:
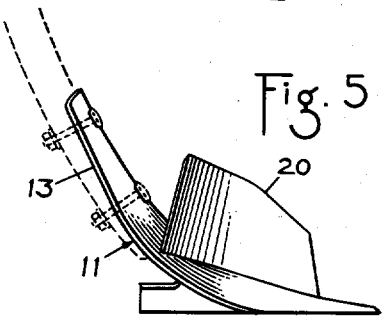
FIG. 5 is a side elevational view as observed from the inner side of the blade shown in FIG. 4.

Referring now in detail to the drawing, 10 designates a right hand blade and 11 designates a left hand blade as considered in the direction of cultivator movement.

The two blades 10 and 11 are of like form except that they are reversed in order to function equally with respect to a plant row intermediate same.

It is to be particularly observed that the blades are not symmetrical to a plane extending centrally through the square bolt receiving apertures 12 in the blade shanks 13 and an important feature of the invention is this non-symmetrical arrangement for reasons later to appear.

While it is highly important that the blades loosen the soil adjacent the rows of plants being cultivated, it is equally important that the blades do not disturb the plant roots.

Accordingly the blades 10, 11 extend to one side of said plane to substantially the extent of the usual form of blades, as is indicated at 14, while the blades are foreshortened at the opposite side of the said plane, as indicated at 15.

Figure 7:
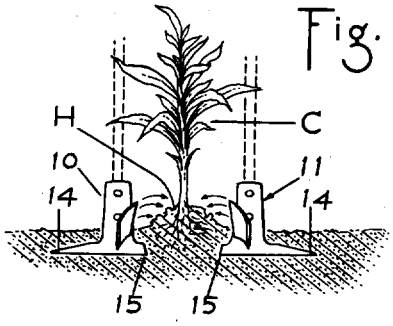
FIG. 7 is a view showing the pair of opposing blades on a reduced scale in front elevation corresponding to FIGS. 3 and 4 and with the blades operatively secured to the cultivator shanks indicated in dotted lines, and the view further showing a plant intermediate the blades and with the soil being thrown about the roots of the plant, by the said blades.

The purpose of the above described blade forms will be readily understood upon consideration of FIG. 7 wherein a right hand blade 10 is disposed at one side of a row of corn C being cultivated, while a left hand blade 11 is shown at the opposite side and with the two blades in symmetrical relation to the row of corn C.

With this disposition of the blades, the wider portions 14 are disposed most remote from the row of corn while the narrower portions 15 are disposed adjacent the row of corn. The wider portions 14 function to loosen and mellow the soil while the narrower portions 15 are disposed sufficiently remote from the corn plant roots so as not to cut off nor injure the lead roots or even the fibers of the plants from which it is obvious that the feeding of natural moisture from the earth up into the corn stalks is wholly uninterrupted.

A further important feature of the invention is the provision of a hilling wing member 16 on the right hand blade 10 and a similar wing member 17 is provided on the left hand blade 11.

Figure 3:
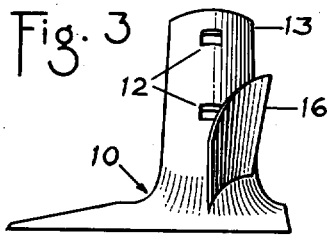
FIG. 3 is a front elevational view of the right hand blade.
Figure 4:
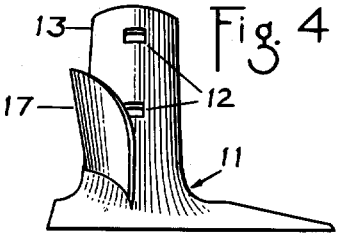
FIG. 4 is a front elevational view of the left hand blade.

As is indicated more particularly in FIGS. 3, 4 and 7, the wing members 16 and 17 are disposed in generally vertical position on the respective blades 10 and 11 adjacent their narrower portions 15 and the opposing pair of wing members are inwardly concave, or concaved toward the row of corn C, as is clearly indicated in FIG. 7 whereby a major volume of the soil loosened by the narrower blade portions 15 is thrown inwardly in the form of a hill H about the stalks of corn.

It is to be particularly observed that the angularly disposed edges 18 and 19 of the blades 10 and 11 are sharp for facilitating the soil cutting action of the blades.

Furthermore, the advance free edges 20 and 21 of the wing members 16 and 17 are also sharp to facilitate movement of the wing members through the loosened soil.

*Moreover, it should be manifest that the wing members 16 and 17 may be respectively formed integrally with the blades 10 and 11. In any event, it is desirable that the wing members be firmly mounted so that their lower marginal edge portions are contiguous to or conform to the upper contour or surface of the blades in order to prevent collection of weeds, grass or debris between the members and blades.*

It should be apparent from the above description that the improved hiller blades perform hilling operations with maximum efficiency while at the same time avoid damage to the plants being cultivated as well as the highly important root system thereof.

While I have disclosed my invention in accordance with a single specific structural embodiment thereof, such is to be considered as illustrative only, and not restrictive, the scope of the invention being defined in the subjoined claims.

What I claim and desire to secure by U.S. Letters Patent is:

1. A hiller blade for plant row cultivators, comprising an attaching shank, a relatively wide soil loosening portion upwardly inclined towards the rear at one side of said shank, a relatively narrow soil loosening portion upwardly inclined towards the rear on the opposite side of said shank, the forward ends of said loosening portions merging into the point of the hiller blade, the relatively wide soil loosening portion being of greater length than the other soil loosening portion, a wing member integral with and mounted on the top surface of said narrow portion for throwing soil loosened by said narrow portion outwardly therefrom, said wing member being upright and extending *rearwardly* from adjacent the point of the hiller blade [rearwardly] and outwardly from said shank.

2. The structure according to claim 1 wherein the outer edges of the soil loosening portions of the hiller blade and said wing member have sharpened leading edges.

*3. A hiller blade for plant row cultivators, comprising an attaching shank for mounting said blade for movement in a predetermined direction, a relatively wide soil loosening portion upwardly inclined towards the rear at one side of said shank, a relatively narrow soil loosening portion upwardly inclined towards the rear on the opposite side of said shank, the forward ends of said loosening portions merging into a point for the hiller blade, said point being substantially directly forward of said shank, the relatively wide soil loosening portion being of greater length than the other soil loosening portion, and a wing member mounted in fixed relation to the blade, said member having a lower marginal edge portion engaging the top surface of said narrow portion and serving to throw soil loosened by said narrow portion outwardly therefrom, said wing member being upright and extending rearwardly from adjacent the point of the hiller blade and outwardly from said shank.*

*4. In combination: a cultivator having a pair of depending supporting shanks laterally spaced with respect to their direction of movement, a pair of hiller blades for straddling plant row cultivation having attaching shanks respectively connected to said supporting shanks, each of said blades comprising a relatively wide soil loosening portion upwardly inclined towards the rear at the outer side of each attaching shank, a relatively narrow soil loosening portion upwardly inclined towards the rear on the inner side of each attaching shank, the forward ends of said loosening portions merging into the point of each blade substantially directly forwardly of its attaching shank, the relatively wide soil loosening portion of each blade being of greater length than the other soil loosening portion, and a wing member for each blade for throwing soil loosened by said narrow portion laterally therefrom, each of said wing members having a lower edge portion supported against the top surface of each narrow portion and being upright and extending rearwardly from adjacent the point of each hiller blade and inwardly from each attaching shank.*

References Cited in the file of this patent or the original patent

UNITED STATES PATENTS

| | | |
|---|---|---|
| 109,491 | Brinly | Nov. 22, 1870 |
| 729,198 | Meister | May 26, 1903 |
| 983,629 | Lundell | Feb. 7, 1911 |
| 1,165,965 | Gausman | Dec. 28, 1915 |
| 2,087,118 | Rooks | July 13, 1937 |
| 2,343,616 | Kay | Mar. 7, 1944 |